United States Patent
Short

(10) Patent No.: US 7,520,037 B2
(45) Date of Patent: Apr. 21, 2009

(54) METHOD OF PRODUCING A FIBROUS PREFORM

(75) Inventor: Andrew Short, Park Hills, KY (US)

(73) Assignee: Messier-Bugatti, Velizy Villacoubaly (FR)

( * ) Notice: Subject to any disclaimer, the term of this patent is extended or adjusted under 35 U.S.C. 154(b) by 342 days.

(21) Appl. No.: 10/581,408

(22) PCT Filed: Dec. 8, 2004

(86) PCT No.: PCT/EP2004/013962

§ 371 (c)(1),
(2), (4) Date: Jun. 1, 2006

(87) PCT Pub. No.: WO2005/059225

PCT Pub. Date: Jun. 30, 2005

(65) Prior Publication Data

US 2007/0120277 A1    May 31, 2007

Related U.S. Application Data

(60) Provisional application No. 60/527,301, filed on Dec. 8, 2003.

(51) Int. Cl.
*D04H 1/46*      (2006.01)
*D04H 18/00*    (2006.01)
(52) U.S. Cl. .......................................... 28/107; 28/114
(58) Field of Classification Search .................. 28/107, 28/115, 114, 113, 108–112, 103, 142
See application file for complete search history.

(56) References Cited

U.S. PATENT DOCUMENTS 3,829,939 A * 8/1974 Dilo ............................. 28/107

(Continued)

FOREIGN PATENT DOCUMENTS

EP    0 695 823 A2    2/1996

(Continued)

OTHER PUBLICATIONS

English translation of the International Preliminary Report on Patentability.

*Primary Examiner*—Amy B Vanatta
(74) *Attorney, Agent, or Firm*—Weingarten, Schurgin, Gagnebin & Lebovici LLP

(57) ABSTRACT

Method for producing a fibrous preform, especially by needling a fiber material (e.g., discontinuous pitch-based or PAN-based fiber). A needle-penetrable mold plate (10) having at least one mold cavity (12) therein for receiving the fiber material is provided. The use of a needle-penetrable mold plate allows the mold plate having the fiber material therein to be passed freely through a linear needling device, such as a linear needling loom, without having to take rigorous care to limit a needling path to the discontinuous fiber material, as in the conventional art. The mold plate is moved relative to the needling device one or more times until a desired level of material density (sometimes measured by fiber content percentage) is attained. Preferably, the mold plate is additionally moved and/or allowed to move along a direction generally transverse to the direction along with the mold plate moves relative to the needling device, so as to avoid the conventional problem of needle "tracking" and thereby create a better needling effect.

32 Claims, 4 Drawing Sheets

U.S. PATENT DOCUMENTS

| | | | |
|---|---|---|---|
| 4,621,662 A * | 11/1986 | Olry | 138/129 |
| 4,790,052 A | 12/1988 | Olry | |
| 4,955,123 A | 9/1990 | Lawton et al. | |
| 5,705,008 A | 1/1998 | Hecht | |
| 5,740,593 A * | 4/1998 | Sheehan et al. | 28/113 |
| 5,864,931 A * | 2/1999 | Best et al. | 28/110 |
| 6,009,605 A * | 1/2000 | Olry et al. | 28/107 |
| 6,385,825 B1 * | 5/2002 | Wang et al. | 28/107 |
| 6,735,836 B2 * | 5/2004 | Jourde et al. | 28/107 |
| 6,948,221 B2 * | 9/2005 | Fuchs | 28/107 |
| 7,251,871 B2 * | 8/2007 | Delecroix et al. | 28/107 |
| 2007/0006432 A1 * | 1/2007 | Noel et al. | 28/107 |

FOREIGN PATENT DOCUMENTS

| | | |
|---|---|---|
| FR | 2 759 387 A | 8/1998 |
| WO | WO 91/01397 A | 2/1991 |

* cited by examiner

METHOD OF PRODUCING A FIBROUS PREFORM

The application claims priority from U.S. Provisional Patent Application No. 60/527,301 filed on Dec. 8, 2003, the entire contents of which is incorporated herein by reference.

FILED OF THE INVENTION

The present invention relates to a method of forming fibrous preforms, especially preforms used as friction members in braking systems and the like. The present invention particularly, but not necessarily only, relates to the fabrication of near-net shape preforms. "Near-net shape" refers to preforms which are close in form and/or shape to a final product, such as a brake disc, with the possible exception of some final processing. For example, a rectangular preform used to form a circular brake disc is not a near-net shape preform, and would necessarily require major processing to arrive at a circular brake disc.

BACKGROUND OF THE INVENTION

The use of carbon fiber material, in general, is known in the field of composite materials.

A particular conventional example of carbon fiber material is a carbon fiber "fabric" including woven and unwoven forms that are produced as large sheets, frequently rectangular in shape. It is known conventionally to cut pieces having a desired shape (e.g., annular) from these sheets as part of the process of producing preforms. This approach has significant problems because the amount of carbon fiber fabric scrap waste generated is economically non-trivial.

Examples of various approaches for addressing the problem of scrap waste are seen in, for example, U.S. Pat. Nos. 4,955,123, 5,705,008, 5,686,117, 6,083,436, 5,952,075, 5,662,855, 5,546,880, and 5,113,568.

One of the approaches in the conventional art is to create spiral fabric (e.g., a braid, weave, or knit) having an internal structure that naturally lies smoothly in an annular shape due to its fabric structure. Spiral fabrics are also known in the art as polar weaves or polar braids. An advantageous reduction of scrap waste using spiral fabrics is at least somewhat offset by the cost and relative complexity of generating the spiral fabric having its unique fabric structure.

Another approach in the conventional art is to cut arcuate or trapezoidal segments from a carbon fiber sheet, wherein the cut segments are arranged in an annular shape to obtain a desired preform. However, this approach still generates a significant amount of scrap waste.

Another conventional approach is to use chopped or continuous fibers placed in an annular mold cavity. The fibers are bonded (for example, using a carbonizable resin) or are needled in a known fashion. In addition, a binder agent is sometimes used to help bind together the fibers. However, this approach also has certain problems.

First, the use of a binder agent is not desirable as it raises the likelihood of introducing impurities into the resultant preform and adds to the cost of manufacture.

Second, needling according to this approach is performed by rotating the annular preform material (either in or out of the annular mold) in an annular needle loom until the desired density characteristic is obtained. However, needling in this manner tends to suffer from "tracking." Tracking is a phenomenon in which reciprocating needle members of the needle loom tend to land sequentially in the same spots across an extent of the fiber material, such that these spots are needled repeatedly. This creates a distinct (often visible) needling pattern in the material, thus the term "tracking." When tracking occurs, the z-fiber content (i.e., the fibers reoriented by needling in the z-direction) in the region of the needle landings is disproportionately large. This can cause in-plane vs. out-of-plane thermal gradients and stress gradients that detrimentally affect the resultant material behavior.

In particular, tracking means that respective needle members of a needling device are landing at substantially the same spots with respect to the fiber material. This means that z-fiber transfer is essentially limited to certain spots in the fiber material, while other areas of the fiber material not beneficially reoriented by the needle members do not receive the effects of needling. In addition, tracking makes it difficult to attain desired material density or fiber content percentages so as to impart desirable physical characteristics.

It is noted that although the fiber material can be considered in terms of its density in a conventional sense (i.e., mass per volume), different types of fibers may be used in different articles, each type of fiber having non trivial differences in their respective densities. Thus, a comparison of densities of two different fiber articles (such as preforms) respectively made from different types of fibers (including among those disclosed above) may be unduly distorted by the differences in the densities of the underlying fibers.

For this reason, it is conventionally known in the art to consider the fiber content of a fibrous article, such as a preform, in terms of a dimensionless value, and moreover, as a percentage.

The fiber content percentage of a fibrous article is the density of the article divided by the density of the fiber, the result being expressed as a percentage. One of skill in the art will appreciate that this transformation essentially normalizes the variations in different fiber densities so as to provide directly comparable values.

In addition to the problem of tracking, the use of an annular loom is necessarily limited to operation on one preform at a time, which limits fabrication throughput.

SUMMARY OF THE PRESENT INVENTION

In view of the foregoing, the present invention relates to a method of producing a fibrous preform which, in part, reduces scrap waste, simplifies manufacture, and can increase production throughput.

In one example, discontinuous fiber material is placed in a needle-penetrable mold plate. The needle-penetrable mold plate may have one or more mold cavities defined therein into which the discontinuous fiber material is received.

The mold plate having the discontinuous fiber material therein is moved relative to a needling device, such as, without limitation, a linear needle loom, along a first direction at least once. The needling device includes at least one needling member which is constructed and arranged in a known manner to reciprocate generally along its axis. The frequency of reciprocation is variable. Usually, a plurality of needle members is provided as a group. As the mold plate is moved relative to the needling device, the needle members pass one or more times into and out of at least the discontinuous fiber material so as to reorient at least some of the discontinuous fiber material in the z-direction.

In particular, the needle members reorient at least some of the discontinuous fiber material in a direction generally along the direction in which the at least one needle member passes through the discontinuous fiber material (sometimes referred to as the "z-direction," as distinct from the x-y plane in which the material can be considered to lie). This reorientation of at least some of the discontinuous fiber material by needling causes a mechanical strengthening and bonding of the fiber material in a manner generally in the art. In particular, this reorientation of fibers in the z-direction has a binding effect on the discontinuous fiber material, so as to convert an initially loose material into an at least somewhat cohesive mass having an increased density.

In contrast to the conventional use of a rotary needling machine, the mold plate of the present invention is needled using a conventional linear needling device, such as a linear needle loom. Because the mold plate itself is needle-penetrable, the mold plate having the discontinuous fiber material therein can be moved relative to the needling device in a simple linear direction, without being limited to needling only the discontinuous fiber material. Accordingly, the one or more needle members of the needling device may penetrate the discontinuous fiber material, the material of the mold plate, or both during needling. This greatly simplifies the process requirements during needling, in comparison to a process that requires limiting needling only to the fiber material.

In addition, to at least reduce the conventional problem of "tracking," the method of the present invention also calls for at least allowing the mold plate to move along a direction generally transverse to the first direction. It is within the scope of the invention to simply let the mold plate shift along a transverse direction as it is advanced along the first direction during needling. If needed, the present invention more particularly contemplates occasionally actively moving the mold plate containing the discontinuous fiber material along a direction generally transverse to the first direction. This at least occasional movement of the mold plate along a second direction may optionally be effectively random. In addition, moving the mold plate along the second direction may occur while the mold plate is being moved along the first direction and being needled. The movement of the mold plate along the second direction may be effectuated by any suitable means, including without limitation, mechanically or manually.

BRIEF DESCRIPTION OF THE DRAWINGS

The present invention will be even better understood with reference to the figures attached hereto, in which.

It is expressly emphasized that the figures herein are meant to merely present examples of the present invention and are not to be construed as limiting the definition thereof in any way. It is also specifically noted that the figures herein are not necessarily to scale, either in general or among interrelated views.

DETAILED DESCRIPTION OF THE PRESENT INVENTION

Figure 1:
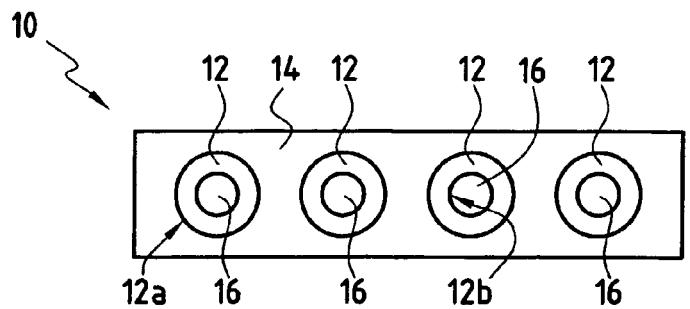
FIG. 1 is a plan view of a mold plate according to the present invention including, by way of example and without being limitative, four mold cavities.
Figure 2A:
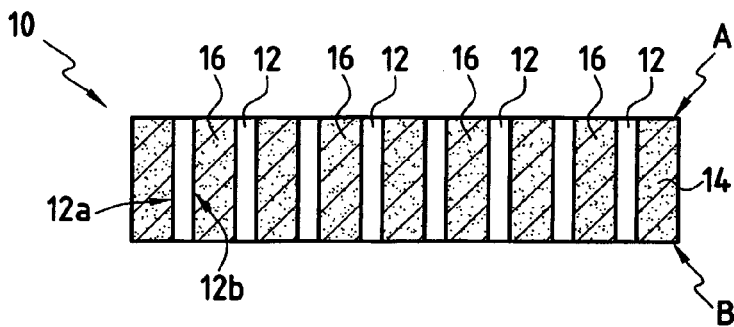
FIG. 2A is a side cross-sectional view of the mold plate of FIG. 1.

FIG. 1 is plan view of an example of a mold plate 10 according to the present invention. FIG. 2A is a side cross-sectional view of the mold plate 10 of FIG. 1.

The mold plate 10 includes one or more mold cavities 12 (four are shown in FIGS. 1 and 2 strictly by way of example) formed in a base portion 14. Hereinafter, the mention of a singular mold cavity or plural mold cavities is to be understood as merely an example of the present invention and not as being limitative.

In one example of the present invention, the mold cavities 12 are annular, generally circular cavities generally defined between an outer mold cavity wall 12a and an inner mold cavity wall 12b. One example for obtaining this arrangement is providing an appropriately sized cylindrical core member 16 within a respective cylindrical opening (as defined by outer mold cavity wall 12a) formed in the base portion 14 so as to define annular mold cavities 12.

Examples of how the core members 16 can be positioned (and, in some cases, fixed or retained) in the respective cylindrical openings of the base portion 14 are described later herein.

A significant feature of the present invention is that the material used to manufacture the mold plate is "needle-penetrable." As used herein, the term "needle-penetrable" refers to a material which freely allows a needle member of a needling device or the like to penetrate thereinto and to pass therethrough, without the needle-penetrable material unduly damaging the needling member (including, for example, dulling the needle member) and without the needle-penetrable material deteriorating before a useful number of needling production cycles.

Strictly by the way of example and without limitation, examples of suitable needle-penetrable materials for manufacturing the mold plate 10 according to the present invention include a three-dimensional textile mold (e.g., a needled material formed into the mold plate), cellular foams (i.e., having an open porosity), neoprene foam, and an expanded polystyrene foam (known in the art under the trademark "Styrofoam").

Figure 6:
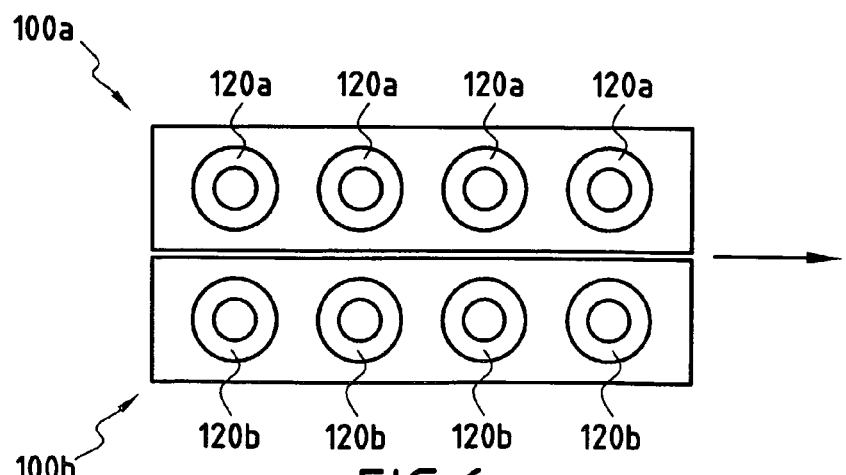
FIG. 6 illustrates an alternative example in which multiple mold plates are processed for needling simultaneously.

Although the periphery of mold plate 10 is shown as being rectangular in FIG. 1, its peripheral form can potentially be of any form, and is primarily limited with respect to size so as to have a proper dimensional relationship with a needling device to be used so as to help ensure a good needling effect. Also, mold plate 10 in FIG. 1 presents a plurality of mold cavities 12 arranged in a column (i.e., along the direction in which the mold plate 10 is passed through the needling device). As mentioned above, even a single mold cavity can be provided. In addition, a plurality of mold plates 100a, 100b, presenting respective columns of mold cavities 120a, 120b, can be provided, as seen in FIG. 6. Mold plates 100a, 100b could be optionally joined or fixed together in operation. Alternatively, one single mold plate (not shown) presenting a plurality of columns of mold cavities could be provided.

In a commercially useful example of the present invention, a mold plate 10 may be 55 mm high by 600 mm wide by 11 m long. It is again stated, however, that these dimensions can be varied in any desirable manner appropriate for the needling device being used, as discussed in more detail below.

In an example of a mold plate according to the present invention, one or more cylindrical openings are formed (e.g., cut) in a block or piece of a given needle-penetrable material (e.g., synthetic foam, such as neoprene). The cylindrical openings may or may not extend completely through the thickness of base portion 14. FIG. 2A illustrates an example in which the cylindrical openings extend through the thickness of base portion 14.

A corresponding number of core members 16 are provided as well. Each core member 16 may or may not be made out of the same material as the base portion 14, but each is at least also made from a needle-penetrable material in accordance with the foregoing.

By appropriately positioning a respective core member 16 in a corresponding cylindrical opening, an annular mold cavity 12 can be defined therebetween (that is, between outer mold cavity wall 12a of base portion 14 and inner mold cavity wall 12b defined by the periphery of the core member 16), into which an appropriate discontinuous fiber material is received for needling.

There is more than one possibility for properly positioning core member 16 within a corresponding cylindrical opening in base portion 14. The most general requirement in this regard is to not impede a needling process used during fabrication of preforms, bearing in mind that needle members of a needling device could land on (i.e., pass through), variously, only the mold plate 10 (i.e., the base portion 14 and/or core member(s) 16), the discontinuous fiber material and the mold plate 10 together, and only the discontinuous fiber material.

In one suitable example, a core member 16 is not physically fixed in place relative to base portion 14, but is simply positioned in place within a respective cylindrical opening. This arrangement is schematically represented in FIG. 2A although the fiber material is not indicated. With this arrangement, a discontinuous fiber material is simply loaded into the annular space of each mold cavity 12 around a core member 16, such that the core member 16 is effectively held in place in a central position by the discontinuous fiber material located between the outer mold cavity wall 12a of base portion 14 and the inner mold cavity wall 12b of the core member 16.

In another suitable example, each core member 16 is fixed in place by an adhesive 13 (which may be, for example, a piece of conventional double-faced tape). In general, the adhesive or tape 13 adheres a core member 16 to an underlying surface, such as scrim fabric 15 covering the underside (i.e., the B side) of mold plate 10, the scrim fabric 15 itself being fixed by tape or other conventional means within the knowledge of a person skilled in the art at a periphery of the mold plate 10. (The means by which the scrim fabric 15 is attached or otherwise fixed to the mold plate 10 is generically indicated at 17 in FIG. 2B.) The use of a scrim fabric 15 is discussed further below. Preferably, the presence of adhesive or tape 13 is limited to the end face of a respective core member 16 and is not exposed to avoid trapping the fiber material because of the adhesive.

Figure 2B:
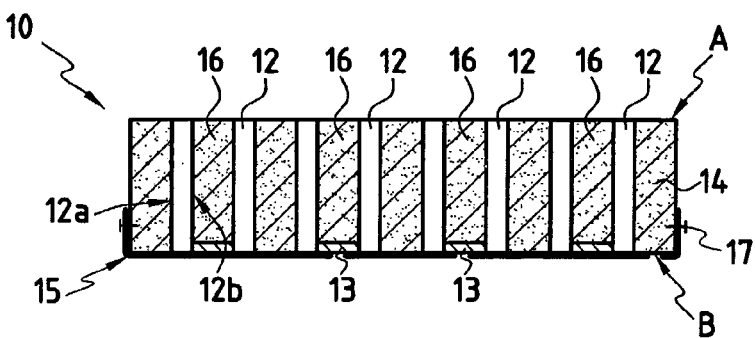
FIG. 2B is a side cross-sectional view of a variant of the mold plate of FIG. 2A.

It is noted, incidentally, that FIG. 2B is not to scale, and in particular that the apparent thickness adhesive or tape 13 and scrim fabric 15 is exaggerated so that it can be clearly indicated in the drawings. In addition, slight notches are visible in FIG. 2B in the layer 15 representing the scrim fabric, corresponding to the two indications of reference numeral 13 and the indication of reference letter B. It is noted that these notches are an illustrative device only, to permit the corresponding lead lines to be clearly shown, and do not indicate a particular structural characteristic of scrim fabric 15.

In order to facilitate handling of a mold plate 10, especially after a discontinuous fiber material is loaded into the molding cavities 12 therein, it is useful according to the present invention to provide a way to retain the discontinuous fiber material in the molding cavities 12 without impeding needling.

Figure 3A:
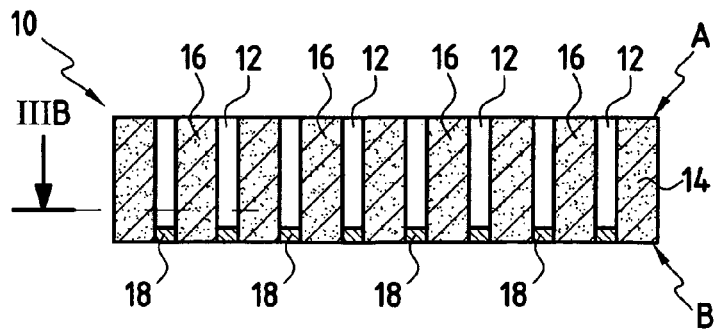
FIG. 3A is a side cross-sectional view of the mold plate of FIG. 1 having optional supports located at or near an axial end of each mold cavity.
Figure 3B:
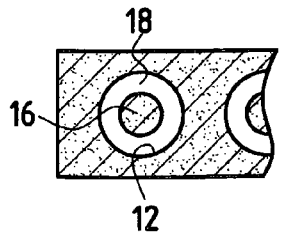
FIG. 3B is a partial cutaway plan view of the mold plate of FIG. 3A along line IIIB illustrating an optional support member for, in part, retaining the discontinuous fiber material in a respective mold cavity.

In one example, relatively thin, annular support members 18 can be placed at the lower axial end of the molding cavities 12 (i.e., on the B side) to close off the bottom side of the molding cavities. See, for example, FIGS. 3A and 3B. Support members 18 are also made from a needle-penetrable material that permits needle members to pass freely therethrough while preferably also being sufficiently durable to last for several production cycles. As can be understood from, for example, FIG. 3B, each support member 18 is dimensioned in accordance with the dimensions of the annular mold cavities 12. That is, each support member 18 has an outside diameter substantially conforming to the diameter of a cylindrical opening formed in base portion 14 and an inside diameter substantially conforming to a diameter of a corresponding core member 16.

The support members 18 can be put into place after corresponding core members 16 are put into place to define the annular space into which the support members 18 are received. For example, with respect to template 20 discussed above, a support member 18 can be put into place as desired after positioning a respective core member 16 using the template 20. Thereafter, the template 20 can be removed.

The support members 18 may, for example, be held in place by the resilience of the material(s) comprising the base portion 14, the core members 16, and/or the support members 18. In an alternative (not shown), the support members 18 may be integral with one or both of the base portion 14 and the respective core members 16. Thus, in this case, fabrication of the mold plate becomes a question, in net effect, of forming the annular spaces of mold cavities 12. Thus, conventional manufacturing methods applicable to a given type of needle-penetrable material can be used to manufacture the mold plate.

In another example, a scrim fabric 15 can be extended across a lower part of mold plate 10 (i.e., the B surface) so as to cover (and effectively close off) the annular mold cavities 12, as seen in FIG. 2B, to retain the discontinuous fiber material in the mold cavities when the mold plate 10 is handled.

Figure 4A:
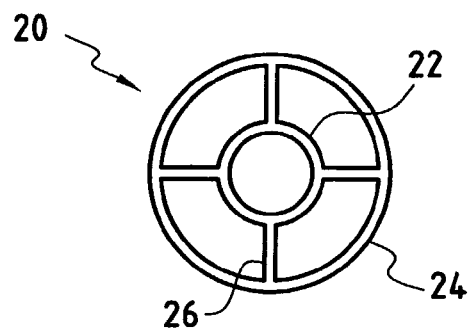
FIG. 4A is a plan view of a template member for positioning a core member in a mold cavity to define an annular mold cavity.
Figure 4B:
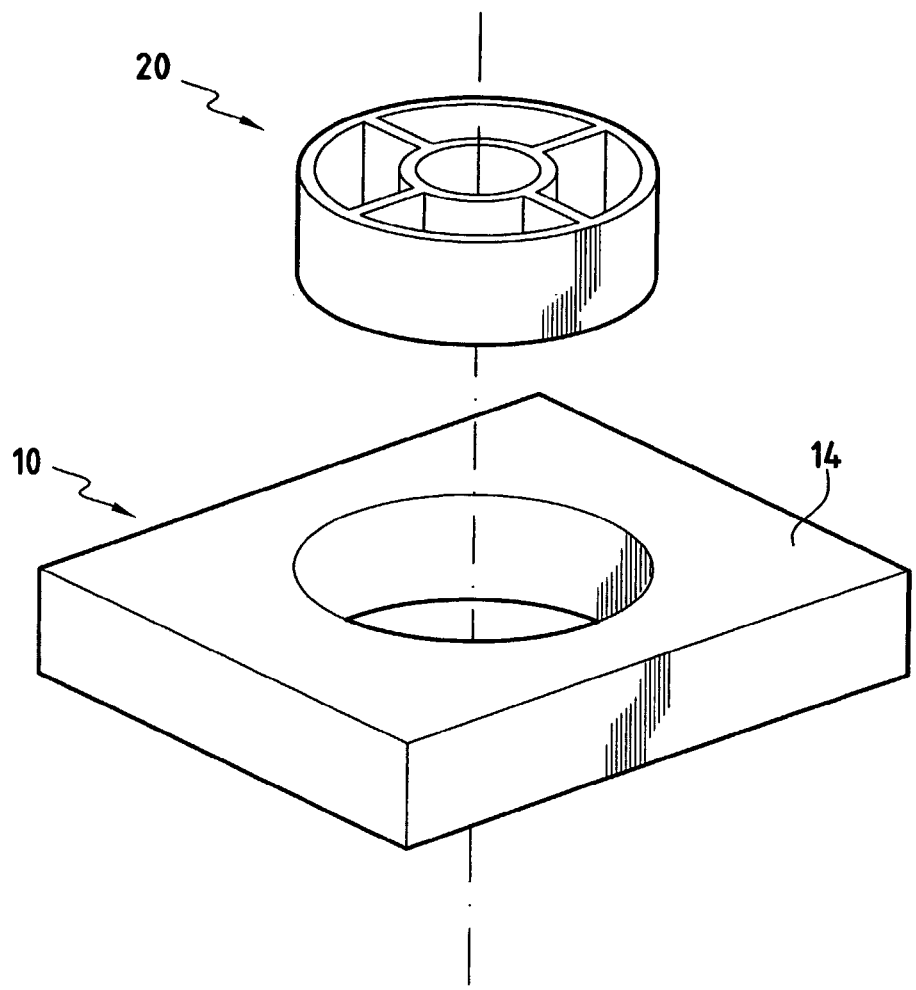
FIG. 4B is a perspective exploded view illustrating the manner in which the template member of FIG. 4A can be placed in a circular cavity formed in a mold cavity in anticipation of position a central core member therein.

FIGS. 4A and 4B illustrate an example of how a core member 16 can be specifically positioned in a cylindrical opening formed in mold plate 10. FIG. 4A is a plan view of a template 20 for locating a core member 16 (not shown) in a respective circular opening formed in base portion 14 of a mold plate 10. In general, template 20 includes an inner ring 22 sized to receive a core member 16, an outer ring 24 sized to substantially correspond with a diameter of a given cylindrical opening provided in mold plate 10, and one or more spokes 26 (four spokes 26 are illustrated in FIGS. 4A and 4B by way of example) extending between inner ring 22 and outer ring 24 to fixedly locate the inner ring 22 in the required location. (Here, a "spoke" generally refers to a member for supporting and orienting inner ring 22 relative to outer ring 24, and equally includes, inter alia, planar members (as illustrated) and rod-like elongate members.)

Template 20 may or may not have significant axial extent (i.e., with-respect to the cylindrical opening formed in base portion 14). FIG. 4B illustrates an example of a template 20 that has an axial extent approximately similar to that of a base portion 14. Template 20 is made any suitable rigid material, such as a metallic material or even cardboard and the like. Preferably, the suitably rigid material is one that can be easily and/or inexpensively formed into the template 20.

In accordance with the foregoing description, the outside diameter of outer ring 24 substantially conforms to the diameter of a respective circular opening formed in base portion 14. In use, a template 20 is placed in such a circular opening, such that the inner ring 22 thereof is properly positioned to receive and thereby position a core member 16. Once the core member 16 is properly positioned in the inner ring 22, template 20 can be removed. If desired, the core member 16 can be fixed in place relative to the base portion 14 before template 20 is removed, in accordance with the description hereinabove.

Commercially available examples of PAN-based carbon fiber include PANEX 35 from the Zoltek Corporation, Thornel T-300 from Cytec Engineered Materials, and SIGRAFIL C produced by the SGL Carbon Group. A commercially available example of pitch-based carbon fiber includes pre-carbonized Thornel P-25 from Cytec Engineered Materials (but typically available commercially in a carbonized state).

The discontinuous fiber material for forming the preforms is arranged appropriately within each mold cavity 12 according to any known method. Certain types of discontinuous fiber material are commercially available in bundles in which the fibers are generally parallel. Depending on the situation, it may be beneficial or easier to scatter the discontinuous fiber material when it is placed in a respective mold cavity 12 so as to at least generally disrupt the parallel fibers. This can be done by, for example, an air hose. Otherwise, the discontinuous fiber material may be placed in each mold cavity 12 without particularly disrupting the bunches of parallel fibers.

The significance of the manner in which the discontinuous fiber material is loaded into the mold with respect to preform behavior requires further investigation.

Once the discontinuous fiber material is in place, it is needled using a conventional needling device, such as a conventional linear needle loom.

Generally, needling is a conventional process in this field of endeavor. The process generally uses one or more needle members (usually a plurality) that are passed one or more times in a direction generally perpendicular to the plane in which fibers in the object being needled lie. In this regard, it is conventional to consider fibers being needled to generally lie in the x-y plane, such that needling occurs in a z-direction.

Needling reorients some of the fiber material into the z-direction, which imparts dimensional stability to the preform as well as desired out-of-plane (z-axis) composite properties. In particular, the needle members are typically provided with one or more radially extending barbs or hooks or the like, which help to capture some fiber material and push (and/or pull) that fiber material in the z-direction, whereby the z-direction orientation of the some of the fibers is obtained. An example of a conventional needling device suitable for use in accordance with the presently disclosed and claimed invention is manufactured by Asselin S.A. of France, and is usually identified as the A.50 loom. Other examples are commercially available from the German company Dilo, including the DI-LOOM OD model.

According another example of the present invention, it can be advantageous to needle both sides (i.e., both the A and B sides) of the mold plate 10. That is, the discontinuous fiber material is needled from the top (A) side of mold plate 10, followed by or simultaneous with needling from the opposite (B) face thereof. It is to be understood that the two needling steps can be performed by one needling device (for example, by providing opposing needling assemblies on opposite sides of a needling processing path) or by using two or more separate needle looms.

For example, if the use of one single machine is desirable, a needle loom that needles from two directions can be used. An example of a commercially available needling device that can needle from both sides is the DI-LOOM OUG II model needle loom from Dilo. It will be appreciated that to the extent that the fiber material in the mold cavities 12 is needled from the B side, the mechanism by which the mold cavities 12 are closed off (i.e., by support members 18, scrim fabric 15, etc.) must be needle-penetrable in the sense already defined above. The A side of the mold cavities could also closed off by scrim fabric 15, support members 18, etc. during needling, but given a choice it is comparatively preferable to not cover the A side of the mold cavities 12 during needling from the A side.

Alternatively, one side of the mold plate 10 can be needled first, after which it can be inverted so that the opposing face thereof can be needled. Needling both sides of the discontinuous fiber material (i.e., from opposing sides) is beneficial because it tends to improve the uniformity of the z-fiber distribution throughout the thickness of the preform. In particular, after the A side of the mold cavities 12 is needled (preferably, but not necessarily, with that end of the mold cavities uncovered), each A side of the mold cavities 12 is then covered (if not already covered) by scrim fabric 15, support members 18, etc.

The mold plate 10 is then inverted. However, the presence of the scrim fabric 15 or support members 18 on the A side retains the fiber material in the mold cavities. Thereafter, if possible (bearing in mind the example above in which a support member on the B side of the mold plate 10 can be integrally formed with the base portion 14 and/or the core member 16), the B side ends of mold cavities are exposed so that the fiber material in the mold cavities 12 is needled from the B side of mold plate 10.

As mentioned previously, "tracking" is a conventional problem in a needling process that occurs when needle members repeatedly land in substantially the same positions on a material being needled.

One solution to avoid tracking is using a needle board (i.e., an assembly of needle members) provided with a random or irregular pattern of needle members sized appropriately to randomize needle landings while still imparting the necessary needling density. This can be achieved, for example, by using a large needle board (for example, greater than 300 mm along the processing direction) to ensure that the needling is complete over the area of the needle board even though the needle members are randomly placed, or by using multiple needle boards to provide the same net effect.

Figure 5:
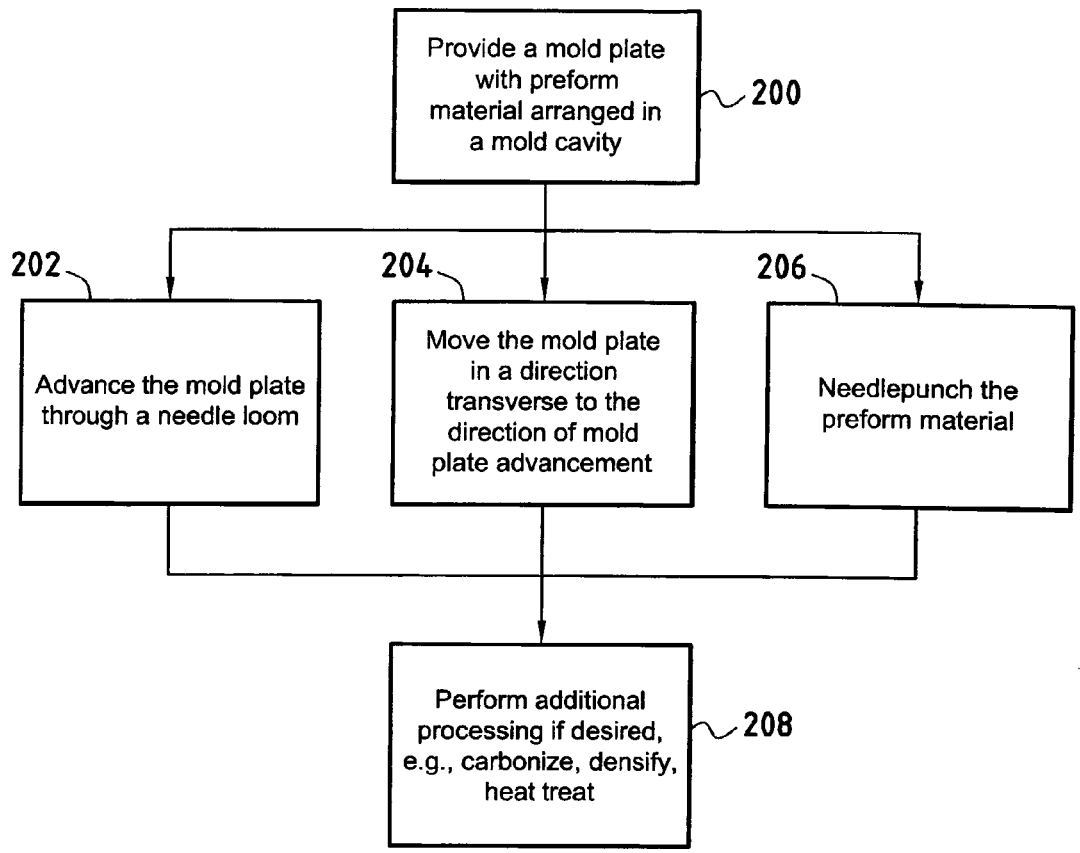
FIG. 5 illustrates an example flow process for the method according to the present invention.

Thus, according to a broad representation of the present invention, as illustrated by the flow chart of FIG. 5, a preform material, such as a discontinuous fiber material, is placed in a mold cavity of a mold plate made from a needle-penetrable material (200). Thereafter, and, in one example, simultaneously, the mold plate is advanced in a first direction through a needle loom (202), the mold plate is allowed to freely move along a second direction orthogonal to the first direction (or it is caused to move in such a fashion) (204), and the mold plate is needled (206). The mold plate is advanced at a desired speed underneath a needle board of a needling device, so that the needling process is more or less continuous, limited only by the length of the mold plate 10 along the direction of advance. The combination of advance speed and needle stroke speed can be adjusted as desired in order to achieve a wide range of needling densities. For example, a slower advance speed and a higher needle stroke speed will increase the number of needle strokes per unit of linear advance.

Thereafter, the resultant needled fiber preform is removed from the mold plate. Finally, further processing is carried out to complete the preform, such as carbonization of the needled preform, densification (using, for example, chemical vapor infiltration), and a final heat treatment (208).

The problem of tracking can also be avoided by allowing the mold plate to have freedom of movement in the transverse direction (orthogonal to the direction along which the mold plate advances).

The desired transverse movement can occur naturally in the course of translating the mold plate through a needle loom when the mold plate is not restricted from transverse movement. Accordingly, to the extent that irregular transverse movements naturally occur, it causes a variation in where needle members of the needle loom land on the mold plate.

Such transverse movements can be encouraged or directly caused by employing a mechanism that imparts slight lateral movements to the mold plate 10 as it travels under the needle board, such as a push bar member (not shown) mounted (e.g., at one or both sides of the mold plate advance path) so as to occasionally nudge, push, or otherwise move the mold plate 10 along the transverse direction. Manually shifting the mold plate along the transverse direction is also contemplated according to the present invention. In a preferable version of such as mechanism, the nudging effect imparted thereby occurs irregularly and even randomly. Preferably the extent of motion along the transverse direction is on the order of several tens of centimeters, for example, about 20 to about 50 centimeters.

Accordingly, by addressing the problem of tracking, a better needling result can be obtained, particularly with respect to desirable levels of fiber density in the preform. In terms of fiber content percentage (as explained above), desirably high percentages of about 25% to about 35% are obtainable.

It is noted here that references to motion along particular directions, such as the direction along which the mold plate 10 advances during needling, or the direction transverse to the direction of mold plate advance, are meant to include motion in the specific directions indicated, as well as in directions at least including a component along the direction in question.

In the present invention, the needling device is preferably sized to process multiple mold plates arranged in parallel, in order to increase the productivity of the system. Alternatively, as discussed above, a single mold plate presenting a plurality of mold cavities (for example, in rows and columns) can also be used. As shown in FIG. 6, mold plates 100a and 100b can be, for example, arranged side-by-side as they advance through the needling device in the processing direction. The mold plates 100a and 100b could also be arranged in sequence (not shown). This type of processing provides greater industrial throughput over the traditional process where only a single preform is needle under an annular needle loom at a time. Moreover, the process is simplified because the mold plate (made from a needle-penetrable material) can be simply passed through the needling device, generally without having to control where the needle members land (for example, as in an annular mold in the conventional art).

Once the discontinuous fiber material has been sufficiently needled to obtain the desired density (or fiber content), the annular preform made from now needled fiber material is removed from its mold cavity 12. In a manner well known in the art of densified composite materials, the preform is subjected to further processing, including one or more of, without limitation, carbonization, densification (using a known process such as chemical vapor infiltration), final heat treatment, and physical milling, so as to obtain a final annular friction member suitable for brakes and the like.

Figure 7:
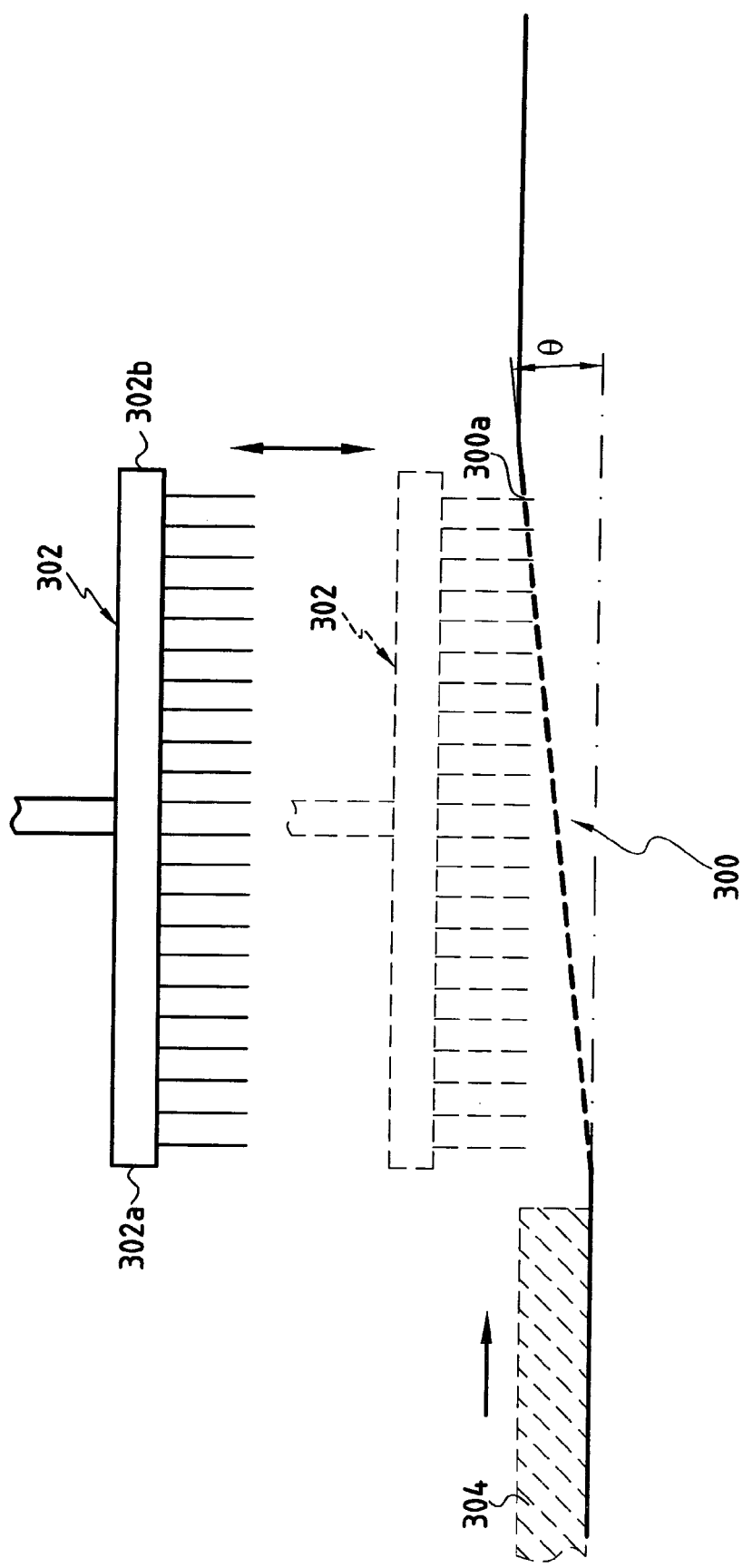
FIG. 7 illustrates an alternative example of needling in which the needle bed slopes upwardly (i.e., towards) a needling device.

In order to further improve the needling results, an upwardly sloped supporting surface can be provided in a needling device such as a needle loom, as illustrated schematically in FIG. 7.

The reason why a sloped supporting surface (sometimes referred to as a "needle bed" in the art) is beneficial is explained as follows.

It is conventionally recognized that the majority of fiber material that is to be transferred in the z-axis direction by a respective needle member is taken from an upper surface of the material being needled. In fact, with a conventional needle member including nine barbs, the first three barbs carry about 60% of the fiber material being transferred to the z-direction on a given needle pass and the needle member as a whole becomes fully loaded (i.e., can no long pick up more fiber material to be transferred in the z-direction) within the first few millimeters of penetration. As a result, if needling is performed with a constant depth of penetration, there is a gradient of z-fiber transfer along the z-direction, wherein the amount of z-fiber being transferred decreases with an increasing depth of penetration.

A past solution for addressing the z-fiber gradient issue was to gradually lower the needling support of the needle loom while building up the preform thickness layer by layer. However, this approach created the possibility of delamination of the preform if the needling was less than ideal, and it greatly slowed processing time because of the need to build layer upon layer.

An approach according to the present invention for addressing the issue of z-fiber gradients is illustrated in FIG. 7. In particular in FIG. 7, a sloping needle bed 300 is provided opposite a reciprocating needle head 302. Needle bed 300 slopes upwardly along the direction of travel of a mold plate 304 according to the present invention, at a variable angle θ. In particular, the angle θ is adjustable in accordance with the thickness of a mold plate 304 being used. The angle θ of the needle bed 300 can be changed by any conventional mechanism, including mechanical devices and manual readjustment. Needle bed 300 may have any known structure for accepting passage of needle members of needle head 302 therethrough. For example, needle bed 300 may be a plate member having appropriately arranged holes 300a formed therethrough for allowing respective needle members to pass therethrough.

Because the needle head 302 has a fixed amplitude of travel when it reciprocates, it will be appreciated that needle members at a first end 302a of the needle head 302 will penetrate a mold plate relatively shallowly whereas the needle members at a downstream end 302b of the needle head 302 will penetrate the mold plate more deeply (if not completely), because the upward slope of the needle bed 300 will bring the mold plate 304 progressively closer to the bottom extreme of the range of travel of the needle head 302. This can be appreciated by the illustration in phantom of the needle head at the limit of its range of motion, which clearly shows the variation in penetration depth of the needle members thereon with respect to the sloped needle bed 300.

With the arrangement of FIG. 7, therefore, the discontinuous fiber material in a mold plate is progressively needled more and more deeply, instead of penetrating the fiber material to the same depth over the whole area of the mold cavity, which causes the quick barb loading and inability to transfer fiber in the z-direction as discussed above.

A downward sloping needle bed (not illustrated) could also bring interesting and/or beneficial effects, but is still under study.

Other forms of carbon fiber can be used, and the present invention is not at all limited to discontinuous fiber material. For example, a continuous carbon fiber such as a continuous carbon filament could be used. Also, a non-woven carbon fiber fabric can be used.

In fact, the concepts presented herein in accordance with the present invention are generally applicable to needling fibrous materials. Accordingly, the present invention could be also applied in other composite material applications that use, for example, ceramic, polymeric, or metallic matrices instead of carbon fiber.

While the present invention has been described with respect to what are believed to be the most practical embodiments thereof, it is particularly noted that this is by way of example only, and appropriate modifications and variations thereof are possible within the spirit and scope of the claims appended hereto.

What is claimed is:

1. A method of producing a fibrous preform, comprising:
   moving a needle-penetrable mold plate containing a discontinuous fiber material along a first linear direction in a plane relative to a needling device that is disposed out of said plane, the needling device including a needle member;
   while moving the needle-penetrable mold plate containing the discontinuous fiber material along the first direction, needling the fiber material by passing the needle member through the fiber material to change a fiber orientation of at least some of the discontinuous fiber material until a predetermined fiber content percentage of the needled discontinuous fiber material is obtained; and
   permitting the needle-penetrable mold plate to move along a second direction within said plane and generally transverse to the first direction.

2. The method according to claim 1, wherein moving the needle-penetrable mold plate containing the discontinuous fiber material relative to the needling device along the first direction comprises moving the needle-penetrable mold plate containing the discontinuous fiber material relative to the needling device a plurality of times along the first direction.

3. The method according to claim 1, wherein moving the needle-penetrable mold plate containing the discontinuous fiber material along a second direction generally transverse to the first direction comprises moving the needle-penetrable mold plate along the second direction while moving the needle-penetrable mold plate along the first direction.

4. The method according to claim 1, wherein the predetermined fiber content percentage is between about 25% to about 35%.

5. The method according to claim 1, wherein the discontinuous fiber material comprises discontinuous PAN-based carbon fiber.

6. The method according to claim 1, wherein the discontinuous fiber material comprises discontinuous pitch-based carbon fiber.

7. The method according to claim 1, wherein the discontinuous fiber material comprises discontinuous PAN-based carbon fiber and discontinuous pitch-based carbon fiber.

8. The method according to claim 1, wherein moving the needle-penetrable mold plate containing the discontinuous fiber material along a second direction generally transverse to the first direction comprises mechanically moving the needle-penetrable mold plate along the second direction.

9. The method according to claim 1, wherein moving the needle-penetrable mold plate containing the discontinuous fiber material along a second direction generally transverse to the first direction comprises manually moving the needle-penetrable mold plate along the second direction.

10. The method according to claim 1, wherein the discontinuous fiber material is provided in a mold cavity defined in the needle-penetrable mold plate.

11. The method according to claim 10, wherein the mold cavity defined in the needle-penetrable mold plate is generally circular.

12. The method according to claim 11, wherein the needle-penetrable mold plate includes a core positioned at a central part of the mold cavity so as to define an annular space into which the discontinuous fiber material is received.

13. The method according to claim 1, wherein the needling device is a needle loom.

14. The method according to claim 13, wherein the needle loom is a linear needle loom.

15. The method according to claim 1, wherein passing the at least one needle member through the discontinuous fiber material comprises passing the needle member through opposing sides of the discontinuous fiber material.

16. The method according to claim 15, wherein passing the needle member through opposing sides of the discontinuous fiber material comprises using a first needling device to pass a first needle member through the discontinuous fiber material from a first side of the needle-penetrable mold plate and using a second needling device to pass a second needle member through the discontinuous fiber material from a second side of the needle-penetrable mold plate opposite to said first side of the needle-penetrable mold plate.

17. The method according to claim 16, wherein the first and second needling devices are both provided in the same linear needle loom.

18. The method according to claim 2, wherein passing the needle member through the discontinuous fiber material comprises passing the needle member through opposing sides of the discontinuous fiber material, the method further including inverting the needle-penetrable mold plate relative to the needle member between respective movements of the needle-penetrable mold plate relative to the needling device.

19. The method according to claim 1, further including passing the needle member through a part of the needle-penetrable mold plate.

20. The method according to claim 1, wherein moving the needle-penetrable mold plate along the first direction includes moving the needle-penetrable mold plate along an upward angle with respect to the first direction.

21. The method according to claim 1, further comprising carbonizing the discontinuous fiber material after attaining the predetermined fiber content percentage.

22. The method according to claim 21, further comprising densifying the carbonized discontinuous fiber material.

23. The method according to claim 22, further comprising heat treating the densified carbonized discontinuous fiber material.

24. The method according to claim 1, wherein the needle-penetrable mold plate includes a plurality of mold cavities into which the discontinuous fiber material is received, the plurality of mold cavities being arranged generally transverse to the first direction.

25. The method according to claim 1, wherein the needle-penetrable mold plate includes a plurality of mold cavities into which the discontinuous fiber material is received, the plurality of mold cavities being arranged generally along the first direction.

26. The method according to claim 24, wherein the needle-penetrable mold plate includes a plurality of mold cavities into which the discontinuous fiber material is received, the plurality of mold cavities additionally being arranged generally along the first direction.

27. The method as recited in claim 1, wherein the needle-penetrable mold plate moves along the second direction at irregular intervals.

28. A method of producing a fibrous preform, comprising:
moving a needle-penetrable mold plate containing a discontinuous fiber material along a first linear direction in a plane relative to a needling device that is disposed out of said plane, the needling device including needle members arranged generally along the first direction;
while moving the needle-penetrable mold plate containing the discontinuous fiber material along the first direction in said plane, needling the discontinuous fiber material with the needle members to change a fiber orientation of at least some of the discontinuous fiber material, until a predetermined fiber content percentage of the needled discontinuous fiber material is obtained, the needling being performed to increasing depths into the discontinuous fiber material as the needle-penetrable mold plate moves along the first direction; and
allowing the needle-penetrable mold plate containing the discontinuous fiber material to move along a second direction in said plane generally transverse to the first direction.

29. The method as recited in claim 28, wherein the needle-penetrable mold plate moves along the second direction at irregular intervals.

30. A method of producing a fibrous preform, comprising:
moving a needle-penetrable mold plate containing a fiber material along a first linear direction in a plane relative to a needling device disposed out of said plane, the needling device including a needle member;
while moving the needle-penetrable mold plate containing the fiber material along the first direction relative to needling the fiber material by passing the needle member through the fiber material to change a fiber orientation of at least some of the fiber material until a predetermined fiber content percentage of the needled fiber material is obtained; and
permitting the needle-penetrable mold plate to move along a second direction in said plane generally transverse to the first direction.

31. The method according to claim 30, wherein the fiber material is one of a non-woven carbon fabric and a continuous carbon filament.

32. The method as recited in claim 30, wherein the needle-penetrable mold plate moves along the second direction at irregular intervals.

* * * * *